G. W. MAXWELL 1,554,868

CLEANSER AND STERILIZER

Filed Nov. 20, 1920 5 Sheets-Sheet 3

INVENTOR
George W. Maxwell
BY
Hardway Cartin
ATTORNEYS

Sept. 22, 1925.

G. W. MAXWELL

CLEANSER AND STERILIZER

Filed Nov. 20, 1920 5 Sheets-Sheet 4

Patented Sept. 22, 1925.

1,554,868

UNITED STATES PATENT OFFICE.

GEORGE W. MAXWELL, OF HOUSTON, TEXAS.

CLEANSER AND STERILIZER.

Application filed November 20, 1920. Serial No. 425,437.

*To all whom it may concern:*

Be it known that I, GEORGE W. MAXWELL, a citizen of the United States, residing at Houston, in the county of Harris and State of Texas, have invented certain new and useful Improvements in a Cleanser and Sterilizer, of which the following is a specification.

This invention relates to new and useful improvements in a cleanser and sterilizer.

One object of the invention is to provide a machine of the character described which is specially designed for the purpose of cleansing and sterilizing glass tumblers, or other containers of similar form.

Another object of the invention is to provide a machine of the character described which will perform the cleansing and sterilizing process automatically.

A further feature of the invention resides in the provision of a machine of the character described which is compact in form and consequently will not occupy much space; and which is comparatively simple in construction and operation and consequently inexpensive in use.

With the above and other objects in view, the invention has particular relation to certain novel features of construction, operation and arrangement of parts, an example of which is given in this specification and illustrated in the accompanying drawings, wherein:

Referring now more particularly to the drawings wherein like numerals of reference designate similar parts in each of the figures, the numeral 1 refers to a tubular pedestal which supports the entire machine. Fixed to the upper end of this pedestal, there is an annular flange 2 which supports a vat 3. This vat is annular in form and is separated into a plurality of chambers, hereinafter designated and which are separated by means of vertical partitions. The vat being annular, there is a central chamber 4 therein, wherein there is mounted an electric motor 5 connected by the wires 6—6' to a suitable source of supply. The motor shaft 7 extends up from the motor and is formed with a worm gear 8 which is in mesh with the large worm gear 9, fixed on the transverse shaft 10, and this shaft carries a small screw gear 11 which is in mesh with a larger screw gear 12 fixed on the counter shaft 13. One end of this counter shaft has a small pinion 14 fixed thereon which is in mesh with the corresponding pinion 15 which is fixed on the lower end of the vertical shaft 17. The upper end of this shaft carries a segmental spur gear 18 and this segmental gear meshes intermittently with the spur gear wheel 19, which is fixed upon the hub 20 of the rotary turret 21 which is mounted upon the supporting bearing 21'. The segmental gear imparts partial rotations successively to the turret. At the base of the vat, within the central chamber, there is an internally geared cam ring 22, which has a bearing around the upper end of the pedestal and the gears of this ring are in mesh with the pinion 23 which is fixed on the lower end of the vertical shaft 24. The upper end of this shaft has a small pinion 25 fixed thereon which is in mesh with a large pinion 26, fixed on the counter shaft 13, and through the mechanism described the cam ring is constantly rotated. This ring has the cam face 27, which is level for a considerable distance and in practice is actually about three fourths of an inch above the level of the lower portion 28 of the ring. Mounted above the cam is a vertical rod 29 which is slidable through suitable guides and whose lower end has the roller 30, which rides the cam ring 22. The upper end of this rod has a rack face 31 which is in mesh with a small gear wheel 32 which is fixed upon the transverse shaft 33. This shaft carries a larger spur gear wheel 34, which is in mesh with a small gear wheel 35 fixed upon the transverse shaft 36. This last mentioned shaft has a large spur gear wheel 37 fixed thereon which is in mesh with a long vertically movable rack member 38. Surrounding the upper part of the tubular housing 39 and spaced therefrom there is a ring 40 and this ring is connected to the rack 38 through suitable slots in the housing. Resting upon the ring 40, there is a larger ring 41 from which depend the strips 42. The lower ends of these strips work through guide ways 43 in the periphery of the turret and the strips 42 carry clamps 44 which receive the glasses to be cleansed. The ring 40 has an up and down movement and the ring 41 has an up and down movement as well as a rotary movement. The up and down movement of the ring 41 is imparted through the ring 40 on which it rests and the rotary movement of the turret is imparted to said ring 41 through the strips 42. The clamps for the glasses are designed to merely hold said glasses on the supporting brackets 45 underneath them. These brackets are pivoted to the respective strips 42 and normally stand out at right angles to support the glasses. Within each clamp there is located a lever 46 which is pivoted to the corresponding strip 42, and when a glass is inserted in the clamp, it will force the upper end of said lever inwardly and throw the lower end, beyond the fulcrum, outwardly for a purpose to be hereinafter explained.

Figures 1, 13, 14:
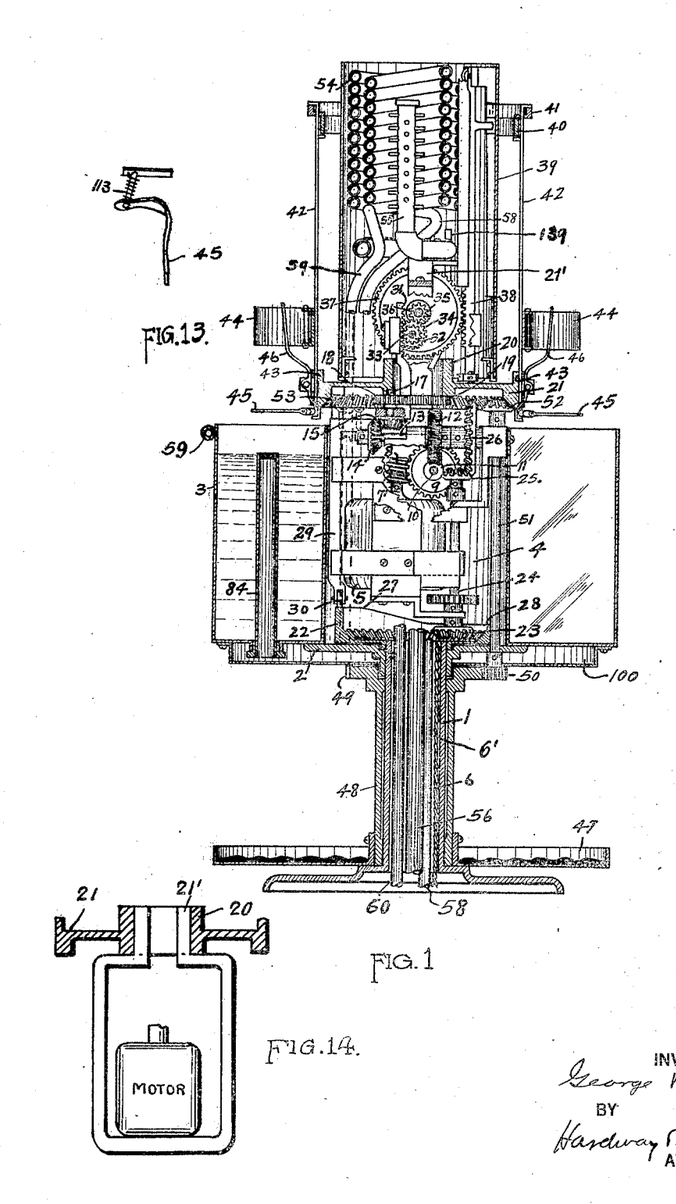
Figure 1 is a vertical, sectional view of the complete machine.
Figure 13 is a perspective view of a bracket employed.
Figure 14 is a fragmentary sectional side elevation showing the supporting bearing for a turret used in connection with the device.
Figure 2:
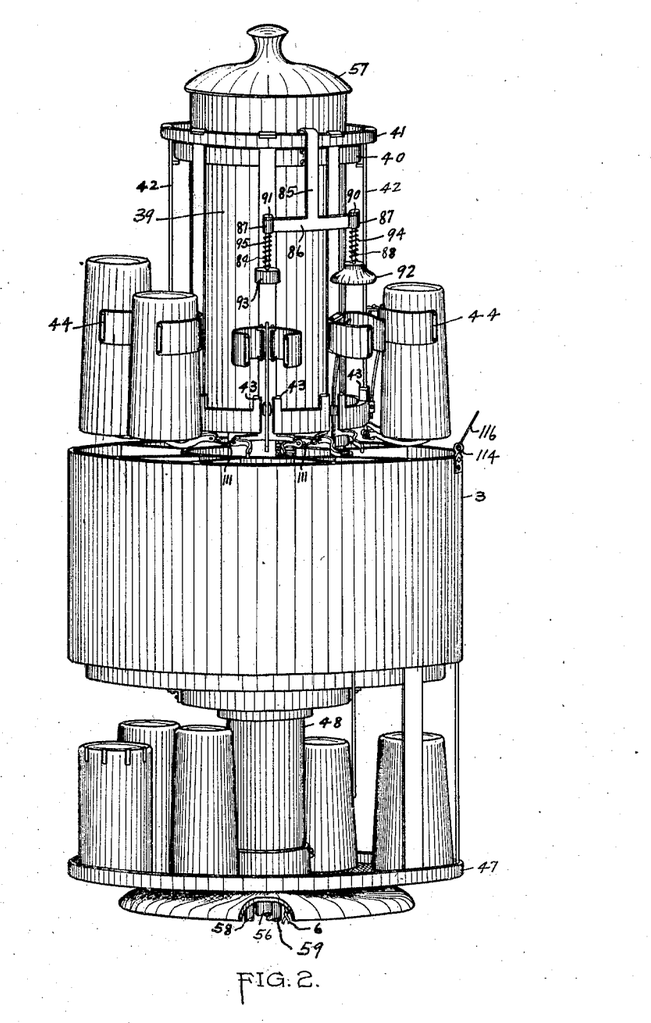
Figure 2 is a side elevation thereof, partially broken away.
Figure 3:
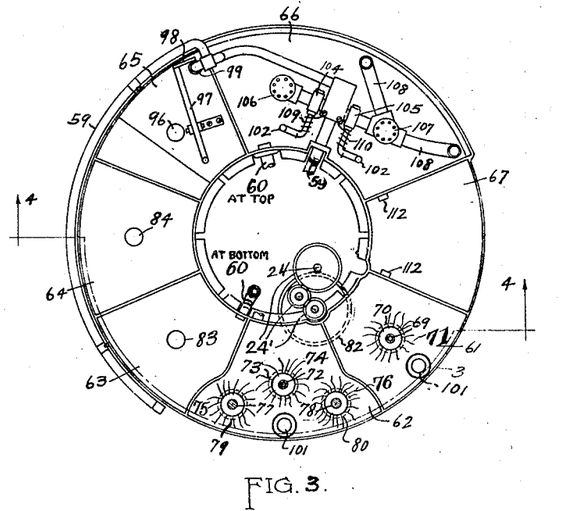
Figure 3 shows a plan view of the dipping and scouring vats employed.
Figure 4:
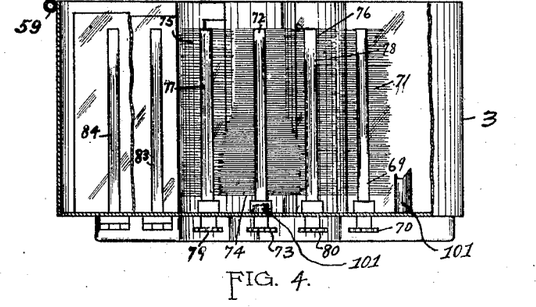
Figure 4 is a sectional view of the vats, taken on the line 4—4 of Figure 3.

Surrounding the pedestal underneath the vat 3, there is a rubber covered tray 47 which is fastened to the lower end of the rotary sleeve 48, which surrounds the pedestal and whose upper end is formed with a spur gear 49, which is in mesh with the spur gear wheel 50, fixed to the lower end of the vertical shaft 51. The upper end of the shaft 51 has a pinion 52 fixed thereon which is in mesh with a bevelled rack face 53 formed on the underside of the turret. The tray 47 is thus geared to rotate in synchronism with the turret. The housing 39 is stationary and confined within it there is a double water coil 54 and a gas burner 55 which is supplied with gas through the pipe 56. The housing 39 has a removable top 57 made removable to permit access to the interior of the housing for lighting the burner, removing the water coil or other repairs. The water coil is connected to suitable inlet and outlet water pipes 58 and 59, the former of which leads up through the tubular pedestal 1, and the latter of which extends into the chamber 4 and is bent laterally to extend through the wall of said chamber, as shown in Figure 3, while the vat is drained by drain pipe 60, which leads down through the pedestal.

As shown the vat is provided with seven compartments designated by the numerals 61 to 67, inclusive. The compartment 61 contains a suitable cleansing solution, and rotatably mounted in a suitable bearing in the bottom thereof there is a centrally located tubular shaft 69 which extends up into said compartment. The lower end of this shaft has the sprocket wheel 70 fixed thereon and its upper end carries bristles forming a cylindrical brush 71.

The compartment 62 also contains a cleansing solution and has a central tubular shaft 72 rotatably mounted in a bearing in the bottom thereof. The lower end of this shaft has a sprocket wheel 73 fixed thereon and its upper end has the cylindrical brush 74. The tumblers, or glasses to be cleansed are fitted over these brushes in inverted position, as hereinafter explained, and their interiors are thereby cleansed, and the air contained in the glasses passes down through said tubular shafts, thus preventing the trapping of air therein. The compartment 62 also has the external cylindrical brushes 75 and 76, which are fixed on the respective shafts 77 and 78. These shafts are rotatable in suitable bearings in the bottom of the compartment 62 and their lower ends carry the sprocket wheels 79 and 80, which are fixed thereon. These brushes 75 and 76 operate against and cleanse the outside of the glasses. A sprocket chain 81 operates over the sprocket wheel 82 which is driven from the shaft 24 through the gear train 24' and is driven thereby and also operates over, and drives, the sprocket wheels 70, 73, 79 and 80 and rotates the shafts on which they are fixed and the brushes mounted thereon. The compartments 63 and 64 contain water into which the glasses are submerged and they contain the air outlet nozzle pipes 83 and 84, which are centrally located and fixed to the bottoms of the respective containers, and provided to form an outlet for the air contained in the inverted glasses as they are submerged. The compartment 65 contains rinsing water and in the compartment 66 the glasses are subjected to hot water sprays. The compartment 67 is bottomless and from it the glasses are singly and successively released.

In operation the glasses are placed, by hand, in the holders successively. The first glass is placed in the holder above the compartment 61 and the motor is then started. When the turret has turned one-eighth of a revolution, another glass is placed in the succeeding holder, and so on.

The first movement of the machine carries the glass downwardly into the compartment 61 over the brush 71, the air escaping from the glass through the hollow shaft 69. This movement is effected through the cam 27, the rod 29, the gearing connected therewith, and the rack member 38 connected to the ring 40. Since the rack members 38 descend only while the turret 21 is stationary, and the turret does not rotate until the said racks return to their elevated position, the racks may pass through suitable holes in the web of the turret while being lowered. As the cam continues to revolve it elevates the glass, through the mechanism described and a one-eighth turn of the turret carries it over the compartment 62 into which it then descends over the brush 74, the air in the glass passing through the shaft 72. Attached to the ring 40, there is an inverted T-shaped hanger 85, the free ends of whose cross bar 86 is formed with bearings 87, 87. The rods 88 and 89 slide through these bearings and their upper ends have the heads 90 and 91, which prevent their detachment. The lower end of the rod 88 carries a vacuum cup 92, which holds the glass against rotation while in position over the brush 71. The lower end of the rod 89 carries a rubber center 93 which contacts with the glass when over the brush 74, but permits it to rotate so that it will be operated on all around by the outside rotatable brushes 75 and 76. The cup 92 and the center 93 are held yieldingly against the glasses by means of the coil springs 94 and 95, which surround the respective rods 88 and 89 and are interposed between the respective bearings 87 and the cup 92, and center 93 respectively. In case the glasses are unusually tall, the rods 88 and 89 slide through their bearings, the coilsprings yielding to permit this.

As the machine continues to operate, the glass is successively submerged in hot water in the compartments 63 and 64 over the air outlet nozzle pipes 83 and 84, and is next submerged in hot water in the compartment 65 over the air outlet nozzle pipe 96. Pivotally mounted in this compartment, there is a lever 97 whose inner end is upturned and whose outer end projects under the arm 98 which is carried by the stem of the outlet valve 99, which controls the discharge of water from the outlet water pipe 59 into the compartment 65. The lower end of each lever 46 is outwardly turned and when the glass descends into the compartment 65 said outwardly turned end will contact against the upturned end of the lever 97 and actuate it to open the valve 99 and admit additional water to said compartment. This water will fill said compartment and overflow the partitions between the compartments and successively fill the preceding compartments, and the overflow will drain out into the pan 100, underneath the vat, through the overflow pipes 101, 101 and from there will pass out through the drain pipe 60.

As the glass is lowered into the compartment 66, the turned end of the corresponding lever 46 will contact against overturned ends of the stems 102 and 102 successively and open the corresponding valves 104 and 105. When the valve 104 is opened, hot water will be sprayed through the nozzle 106 within the glass and when the valve 105 is opened, hot water will be sprayed through the nozzle 107 on the inside of the glass, and will also be sprayed through the vertical nozzles 108, 108 against the outside of the glass to rinse it thoroughly, outside and inside. The valves 104 and 105 are normally held closed by coil springs 109, 110, which surround the stems 102 and 102 and are attached at one end to the respective stems and at the other end to the corresponding valve casing.

It is to be noted that the water discharged into the compartments 65 and 66 comes directly from the heater and is consequently boiling hot and effectually sterilizes the glasses, but as it overflows successively into the preceding compartments, it becomes gradually cooler, so that the temperature of the glasses is gradually raised, thus avoiding breakage of the glasses by sudden change of temperature.

The supporting brackets 45 are arranged in pairs, one pair for each glass, and as the glass is lowered into the release compartment, the outwardly turned lugs 111, 111 carried by said brackets, strike against the opposing inturned lugs 112, 112, carried by the side walls of the compartment 67. The brackets 45 will be thereby turned outwardly, on their pivots, from under the glass and the glass will be thereby released from its clamp 44 and will drop down onto the tray 47. Upon return of the holder mechanism, the brackets 45 will be restored to the former position under the holder clamp 44 by means of coil springs 113, 113 attached to the brackets.

Secured to the edge of the vat 3 opposite the compartment 61, there are the spaced bearings 114, 114 in which the shaft 115 is rotatably mounted. Fixed to this shaft, between the bearings, there is an actuating plate 116. Secured to one end of the shaft there is a beveled segmental rack 117, which is in mesh with a pinion 118. This pinion is fixed on the outer end of the radial shaft 119, which is mounted in suitable bearings 120, 120 secured to the partition wall of the vat. The inner end of the shaft 119 extends through the inner wall of the vat and has the disc 121 fixed thereon, which carries the radiating spaced fingers 122. The turret 21 has depending lugs 123 spaced apart, adapted to contact successively with said fingers as the turret rotates and to impart successive partial rotations to the shaft 119, and through it to the shaft 115. The opposite end of the shaft 115 has the arm 124 fixed thereon, to the free end of which the upper end of the link 125 is attached. The other end of this link is attached to a rod 126 which is vertically slidable in the bearings 127, 127 carried by the partition wall of the compartment 61. A bracket 128 is slidably mounted on the rod 126 between the bearings 127. The upper and lower ends of this bracket have the overturned ears 129, 129 forming bearings for said rod, and between said bearings, the rod is formed with an enlarged section 130 adapted to contact against the upper and lower bearings of the bracket, to impart a limited upward or downward movement thereto. The lower end of the bracket carries a contact tongue 131 adapted to contact with a corresponding tongue 132, which is fastened to but insulated from said partition wall and connected to the electric wire 6, in circuit with the motor 5. When the bracket is in its lowest position, said tongues will contact and complete a circuit through said wire 6 and wire 6' to the motor 5, and the motor will be started, and when said bracket is elevated, the circuit will be broken, and the motor stopped. Pivoted to said partition wall, there is a lever 133, one end of which projects into the bearing notch 134 in the bracket and the other end of which is bifurcated, and whose fingers embrace the stud 135, carried by the outer end of the arm 136. This arm is fixed to the outer end of the valve stem 137 of the valve 138. This valve controls the gas inlet pipe 56 and when the bracket is lowered to complete the circuit, and start the motor the bifurcated end of the lever 133 will be elevated and will open the valve 138, admitting gas to the heater which is ignited by the pilot light 139.

Figure 10:
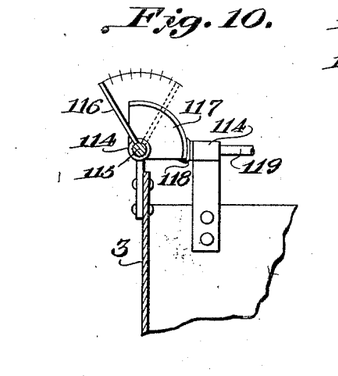
Figure 10 shows a fragmentary sectional view taken on the line 10—10 of Figure 9.
Figure 11:
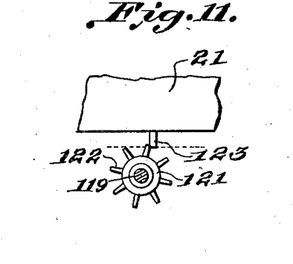
Figure 11 shows a fragmentary side view of the turret and the adjacent part of said mechanism.
Figure 12:
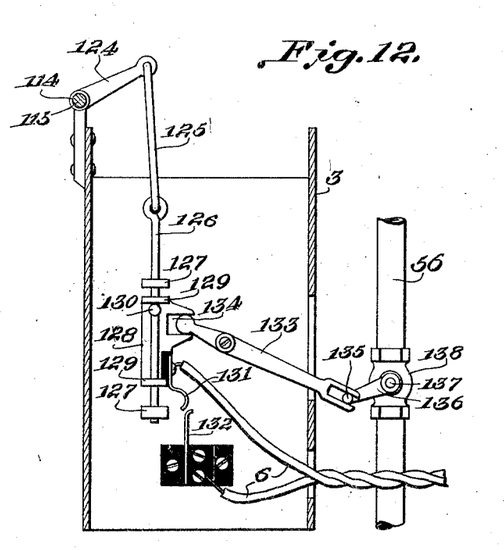
Figure 12 shows a fragmentary sectional view of the vat 3 showing a partial side elevation of said mechanism.

As the glass is placed on the brackets over the compartment 61 it is engaged against the plate 116 and said plate is turned inwardly into the position indicated by the dotted lines in Figure 10, and this will operate through the mechanism just described to force the rod 126 downwardly carrying the section 130 against the lower bearing 129 and lowering said bracket until the tongues 131 and 132 contact. The motor is thus started and the gas turned on as described. The turret then begins to rotate and the lugs 123 will contact successively with the fingers 122, thus imparting partial rotations to the shaft 119, and gradually carrying the actuating plate back to its original position in steps as indicated by the scale in Figure 10. Simultaneously the rod 126 will gradually be lifted. However, as successive glasses are placed on their supporting brackets, said plate 116 will be carried back to the position indicated by the dotted lines in Figure 10, and the rod 126 will thus constantly be forced back to its lowest position as the successive glasses are placed in position. After the last glass is placed in position, it will require a complete rotation of the turret to elevate the rod 126, through the mechanism just described until the enlarged section 130 contacts against the upper bearing 129 and breaks the connection between tongues 131 and 132 thus breaking the circuit and stopping the motor and at the same time shutting off the gas. A glass, or a number of glasses, may thus be placed in the machine to be cleansed and the act of placing said glasses will automatically start the machine and the machine will continue to run until the turret has performed a complete rotation and the last glass has been discharged, and it will then automatically stop and the gas will be automatically cut off.

Figure 5:
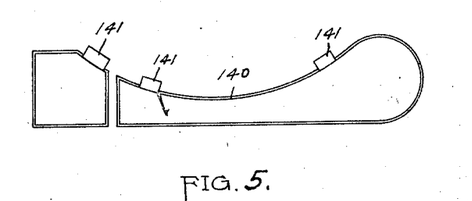
Figure 5 shows a plan view of a detachable receptacle provided to be secured to the machine.
Figure 6:
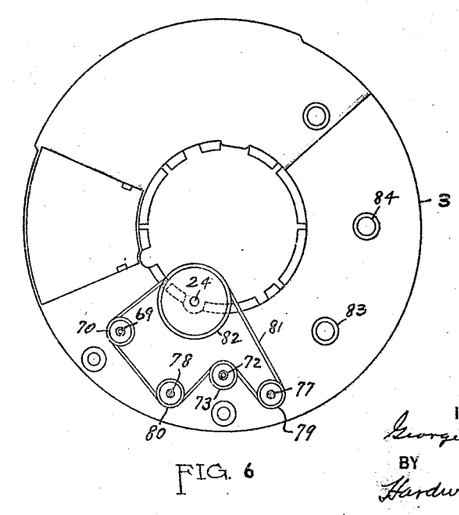
Figure 6 shows a bottom view of the vats.
Figure 7:
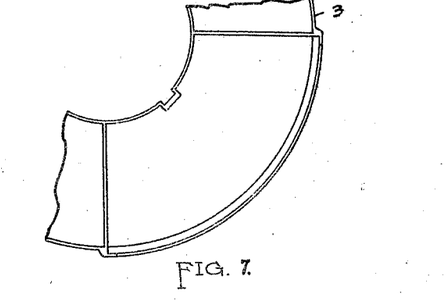
Figure 7 shows a fragmentary plan view of one of the vats.
Figure 8:
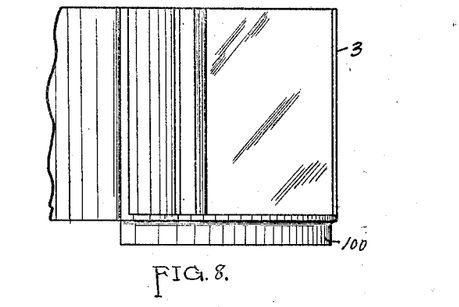
Figure 8 shows a fragmentary side view thereof.
Figure 9:
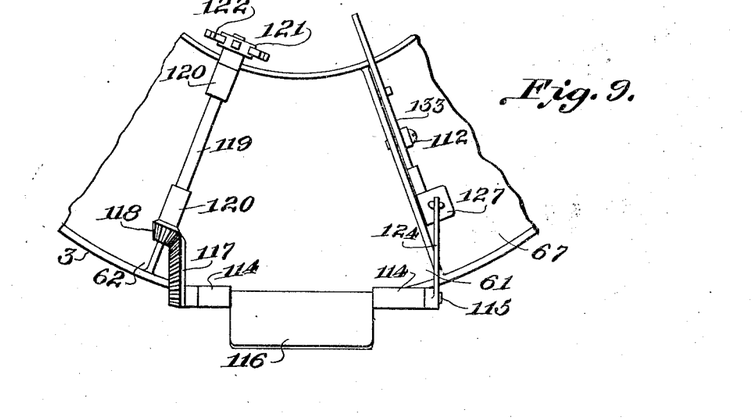
Figure 9 shows a fragmentary view of the vat with the automatic starting and stopping mechanism attached.

The receptacle 140, shown in Figure 5 may be removably attached to the upper edge of the vat by means of the hooks 141, and is provided for the purpose of containing knives, forks and spoons and other similar utensils.

What I claim is:

1. A device of the character described, including a vat having compartments for individual glasses, a rotatable turret mounted above the vat, glass holders one for each compartment mounted on the turret and vertically movable relative thereto, means for rotating the turret, and means for elevating and lowering said holders relative to the vat.

2. A device of the character described including a vat having a plurality of compartments arranged in annular relation for receiving individual glasses, a rotatable turret mounted above the vat, individual glass holders carried by the turret and vertically movable relative thereto, said holders being arranged one for each compartment, means for rotating the turret and means for lowering the holders into the compartments of the vats successively.

3. A device of the character described including a vat having a plurality of compartments, a water heater, an inlet water conduit leading to the heater, a water conduit leading from the heater and provided to discharge water into the vat to fill the compartments thereof, a valve controlling said discharge conduit, a turret rotatably mounted above the vat, glass holders carried by the turret and vertically movable relative thereto, means for rotating the turret, means for lowering the holders into said compartments successively as the turret rotates, and a valve actuating device, actuated by the successive holders, as they descend, to open said valve.

4. A device of the character described including a vat having a plurality of compartments, means for supplying water to said compartments, a plurality of glass holders arranged to revolve, with successive partial rotations, above the vat, means for lowering said holders into, and withdrawing them from, said compartments successively, intervening the partial rotations thereof.

5. A device of the character described, including a vat having a plurality of compartments, means for supplying water to said compartments, a plurality of glass holders arranged to revolve, with successive partial rotations, above the vat, means for lowering said holders into, and withdrawing them from, said compartments successively, intervening the partial rotations thereof, and an upstanding rotatable brush in one of said compartments.

6. A device of the character described, including a vat having a plurality of compartments, means for supplying water to said compartments, a plurality of glass holders arranged to revolve, with successive partial rotations, above the vat, means for lowering said holders into, and withdrawing them from said compartments, successively, intervening the partial rotations thereof, an upstanding rotatable brush in one of said compartments adapted to operate against the interior of the glass when lowered into said compartment, a plurality of upstanding rotatable brushes in another compartment adapted to operate against the interior and exterior of the glass when lowered into said compartment, and means for rotating the brushes.

7. A device of the character described, including a vat having a plurality of compartments, means for supplying water to said compartments, a plurality of glass holders provided to receive inverted glasses and arranged to revolve above the vat with successive partial rotations, means for lowering said holders into and withdrawing them from said compartments, successively intervening the partial rotations thereof, to submerge said glasses, and upstanding tubular air outlet pipes arranged in said compartments.

8. A device of the character described including a vat, a rotatable turret mounted above the vat, glass holders mounted on the turret and vertically movable relative thereto, a centrally positioned water heater above said turret, a water conduit through which heated water is discharged into the vat, means for rotating the turret and means for elevating and lowering said holders relative to the vat to submerge the glasses in, and withdraw them from, the water in said vat.

9. A device of the character described including a vat, a rotatable turret mounted above the vat, glass holders adapted to receive inverted glasses, mounted on the turret, and vertically movable relative thereto, a water conduit through which water is delivered into the vat, a spray nozzle connected to said conduit, a valve controlling said nozzle, means for rotating the turret and also elevating and lowering said holders relative to the vat to submerge the glasses in the water in the vat, and means actuated by the holders, successively when lowered, to open said valve to permit the water to spray through them against said glasses successively.

10. A device of the character described including a pedestal, a vat fixed to said pedestal, a rotatable tray mounted on the pedestal underneath the vat, a rotatable turret supported above the vat, glass holders mounted on the turret and vertically movable relative thereto, a mechanism in operative connection with the turret and tray through which they are rotated, said mechanism also being connected with said holders through which the same are lowered into and elevated from the vat.

11. A device of the character described including a pedestal, a vat fixed thereon, a tray rotatably mounted on the pedestal, a rotatable turret above the vat, a mechanism in operative connection with the turret and tray through which the same will rotate by successive partial rotations, glass holders carried by the turret and vertically movable relative thereto, said mechanism being operatively connected with the holders and adapted to lower the same into and elevate them from the vat, intervening partial rotations of the vat.

12. A device of the character described including a vat having a plurality of compartments, one of said compartments being open underneath, a plurality of glass holders above the vat, means for imparting intermittent revolution of the glass holders as a unity, means for lowering said holders into and withdrawing them from said compartments intervening the partial rotations thereof and means for releasing the holder from the glass lowered into said open compartment.

13. A device of the character described including a vat, having a plurality of compartments, one of which is open underneath, a rotatable tray underneath the vat, a rotatable turret above the vat, a plurality of glass holders above the vat, means for imparting intermittent revolution of the glass holders as a unity, means for lowering said holders into and withdrawing them from said compartments intervening the partial rotations thereof, and means for discharging the glass lowered into said open compartment into said tray.

In testimony whereof I have signed my name to this specification.

GEORGE W. MAXWELL.